United States Patent [19]

Kavaya et al.

[11] 4,434,490
[45] Feb. 28, 1984

[54] SPECTROPHONE STABILIZED LASER WITH LINE CENTER OFFSET FREQUENCY CONTROL

[75] Inventors: Michael J. Kavaya, San Gabriel; Robert T. Menzies, Pasadena, both of Calif.

[73] Assignee: The United States of America as represented by the Administrator of the National Aeronautics and Space Administration, Washington, D.C.

[21] Appl. No.: 364,126

[22] Filed: Mar. 31, 1982

[51] Int. Cl.³ .............................................. H01S 3/10
[52] U.S. Cl. ...................................... 372/20; 372/28; 372/32
[58] Field of Search .................... 372/32, 28, 19, 20, 372/25, 26, 29

[56] References Cited

U.S. PATENT DOCUMENTS

| 3,686,585 | 8/1972 | Javan et al. | 372/32 |
| 3,711,786 | 1/1973 | Vautier et al. | 372/32 |
| 3,938,365 | 2/1976 | Dewey, Jr. | 372/28 |

*Primary Examiner*—William L. Sikes
*Assistant Examiner*—Leon Scott, Jr.
*Attorney, Agent, or Firm*—John R. Manning; Paul F. McCaul; Thomas H. Jones

[57] ABSTRACT

Continuous offset tuning of a frequency stabilized cw gas laser (10) is achieved by using a spectrophone (14) filled with the same gas as the laser for sensing a dither modulation, detecting a first or second derivative of the spectrophone output with a lock-in amplifier (28), the detected output of which is integrated (36), and applying the integrator output as a correction signal through a circuit (24) which adds to the dither signal from an oscillator (22) a dc offset (B1) that is adjusted with a potentiometer (26) to a frequency offset from the absorption line center of the gas, but within the spectral linewidth of the gas. Tuning about that offset frequency is achieved by adding a dc value (B2) to the detected output of the dither modulation before integration using a potentiometer (30). Tuning may also be achieved by changing the amplitude of dither modulation, or changing the pressure of the spectrophone gas, or any combination of these three tuning parameters which affect the amount of offset of the stabilized frequency from line center.

13 Claims, 6 Drawing Figures

SPECTROPHONE STABILIZED LASER WITH LINE CENTER OFFSET FREQUENCY CONTROL

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and apparatus for continuous offset tuning of a frequency-stabilized gas laser over the spectral linewidth of the gas.

It is frequently necessary, or desirable, for general laboratory applications to offset a $CO_2$ gas laser from the line center, but it then becomes a problem of stabilizing the frequency. The prior art teaches techniques for so stabilizing a gas laser that it seeks the center of an absorption line of a gas molecule, or for stabilizing on a few specific laser lines offset from the center using the Stark technique.

The present invention provides an improved technique for stabilizing frequency of a gas laser capable of continuous offset tuning over the spectral linewidth of the gas. That is an improvement over the prior art Stark technique which is restricted to a small number of laser lines, or other techniques that stabilize at the line center, in that the offset from line center can be chosen for every laser transition with the ability to stabilize at any spectral line with any desired offset from line center. The improved technique is applicable to several types of gas lasers such as, but not limited to, CO, $CO_2$ and $N_2O$, with the same gas in the spectrophone.

SUMMARY OF THE INVENTION

In accordance with the present invention, a sensitive spectrophone is employed for sensing a dither modulation of the frequency of a continuous wave (cw) gas laser beam. The spectrophone, filled with the same gas as the laser, receives a small fraction of the laser beam through a beam splitter, and produces an electrical output signal corresponding to the Lorentzian, Doppler or Voigt line response of the spectrophone gas, which has been selected to be the same gas as the laser gas. The first or second derivative of that line response is a signal that is integrated and used as a frequency correction signal. A variable dc offset voltage is added to the correction signal for continuous offset tuning of the laser over the spectral linewidth of the laser gas. Once the laser is locked and stabilized at some point off center, the amount of offset can be adjusted by varying either the dc offset voltage, the dither amplitude and/or the pressure of the gas in the spectrophone. Because the spectrophone output signal is proportional to the laser power, the frequency stabilizing loop is dependent upon a stable laser power output. To remove this dependence, the laser power is detected and the spectrophone output signal is divided by the detected laser power.

DESCRIPTION OF THE PREFERRED EMBODIMENTS

Figure 1:
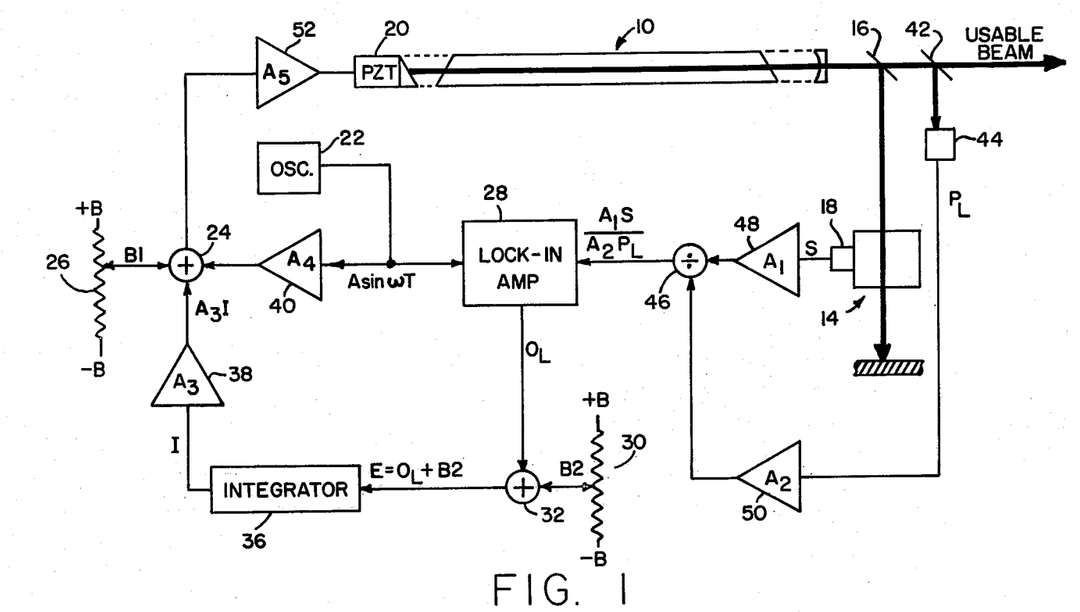
FIG. 1 is a schematic diagram of the present invention.

Referring to FIG. 1 of the drawings, a $CO_2$ continuous wave (cw) laser 10 is shown by way of example. A portion of the laser beam is directed through a spectrophone 14 by a beam splitter 16. The spectrophone is typically filled at a low pressure with the same gas as the laser. The gas pressure in the spectrophone determines the width of its absorption line which is a factor in the tuning control, as will become apparent from the following description. For the present, it is sufficient to understand that the lower the pressure, the narrower the line. The width of the line may be defined through the parameter $\gamma_L$, which is the half-width at half maximum (HWHM), the frequency spread from center to one half of the peak.

If the light beam through the spectrophone were modulated on and off as by a chopper, the electrical signal from a microphone 18 of the spectrophone 14 would be proportional to the height of the original absorption curve. However, in accordance with the invention, a cw laser is modulated by a sinusoidal dither voltage applied to a piezoelectric transducer, e.g. a lead zirconate-lead titanate (PZT) ceramic 20, from an oscillator 22 applied through an adder 24 summing two other voltages, one from a potentiometer 26 providing a dc bias voltage B1, and the other a correction signal from a lock-in amplifier 28 superimposed on a second dc bias voltage B2 from a potentiometer 30 through an adder 312 and integrated by an electronic circuit 36. The integrator is coupled to the adder by an amplifier 38.

The voltage B1 is an offset voltage which is adjusted to tune the laser to the desired operating region within the spectral linewidth of the gas. The oscillator provides the sinusoidal dither signal which is amplified by a circuit 40, the gain of which is adjustable, and applied to the PZT. This sinusoidal voltage dithers the length of the laser cavity ever so slightly, which in turn dithers the output of the laser correspondingly in a periodic fashion. In effect, the frequency is being dithered as shown along the absorption curve of graph A in FIG. 2.

Figure 2:
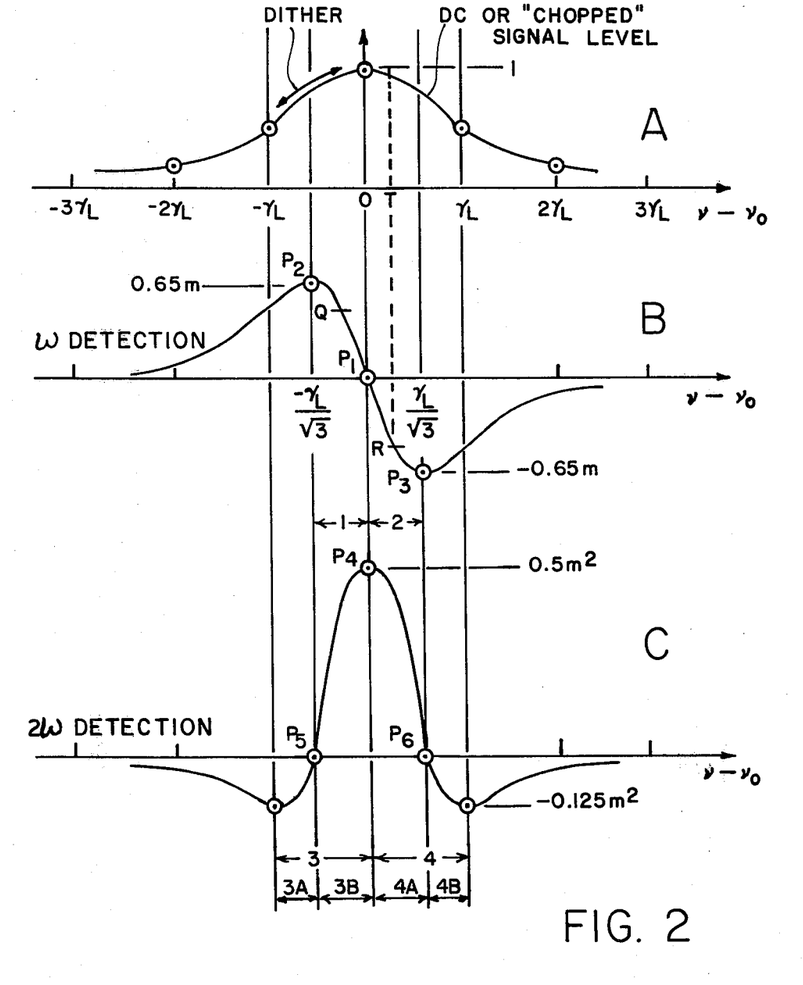
FIG. 2 illustrates operation of the invention by graphs A, B and C for a Lorentzian curve example.

If the dithered spectrophone signal is fed into the lock-in amplifier and detected at a frequency $\omega$, which is the original dither frequency, then the correction signal output $O_L$ will be proportional to the first derivative of the absorption curve, as shown in graph B of FIG. 2. The output voltage, $O_L$, in this case will be zero at the center, positive to the left, and negative to the right. If desired, graphs B and C can be inverted with respect to the horizontal axis with amplifiers. If detection is done at frequency $2\omega$, the lock-in detection occurs at twice the dither frequency; the output signal $O_L$ is proportional to the negative of the second derivative of the curve of graph A, or the negative of the derivative of the first derivative in graph B, as shown in graph C.

The first derivative has a zero-crossing at line center (point $P_1$) and two maxima at points $P_2$ and $P_3$. The second derivative curve has a maximum at line center point $P_4$ and two zero crossings at points $P_5$ and $P_6$; the zero crossings are a certain distance from center corresponding to the maxima of the first derivative which has only one zero crossing that is always on line center.

Zero crossings are a very important consideration, because, in the prior art feedback loop, the output of the lock-in amplifier is integrated directly, and the integrated signal adds into the PZT voltage, creating a compensation voltage at a stable operating point. The stable operating point is where the error signal E (FIG. 1) is zero. Therefore, in detecting the dither signal using the first derivative, the only stable operating point is at $P_1$ (graph B) where the output, $O_L$, of the lock-in amplifier is zero. If the second derivative technique is used, the only two stable operating points are at $P_5$ and $P_6$ (graph C) where the output of the lock-in amplifier is zero. The reason the zero point is required for stability is that the integrator 36 is integrating a voltage equal to zero only at that point so that its output is unchanging.

The essence of the invention is embodied in the fact that the zero-crossing points $P_1$, $P_5$ and $P_6$ are not the only frequencies at which the system can be stabilized. If it is desired to stabilize at any given frequency (point on the detection curve of graph A), voltage B2 (which is either + or −) is added, using potentiometer 30 to the output of the lock-in amplifier 28 before integrating it as an error signal, E. The conditions for stability are still at E=0, because the integrator is not integrating anything, but now for E to be zero, it is required that the lock-in amplifier output be equal to −B2 so that the sum ($O_L$+B2) be zero. If it is thus required that the lock-in amplifier output be equal to −B2, and if B2 is set properly, it can be seen that on the first derivative curve of graph B, the stabilized frequency can be ranged anywhere between the positive and negative peaks $P_2$ and $P_3$ with the adjustment of B2. If B2 is set at a level Q shown in FIG. 2, graph B, then the lock-in output has to be at level R, the negative of B2, which means that the laser operating frequency will be at the operating point T (graph A) and the laser will be stabilized there.

In the second derivative technique, the initial operating point may be, for example, at point $P_6$. The operating point will move either up or down the curve of graph C (FIG. 2) by adjusting voltage B2, since again the stability condition is that $O_L = -B2$.

The following is a summary of the operating regions in the first derivative technique.

INTERVALS OF STABLE FREQUENCY OFFSET $\omega$ Detection (1st Derivative)

Lock-In Phase=$\phi$=0° (Assume laser freq. increases as PZT voltage increases; and $A_3$, $A_4$, $A_5$>0)

POINT P1 FOR B2=0 (as in the prior art)
INTERVAL (1) FOR B2<0
INTERVAL (2) FOR B2>0
If the gain $A_3$ of amplifier 38 (FIG. 1) is <0, add 180° to $\phi$.
In this first derivative ($\omega$ detection method, the lock-in amplifier would be set to 0 degrees (in phase) because the signal it detects at $\omega$ would be in phase with the oscillator output Asin$\omega$T, and stabilization in interval (1) if voltage B2 is less than 0, because that means the lock-in voltage is greater than zero, and stabilization in interval (2) if voltage B2 is greater than zero, because lock-in must be the opposite of it, as noted above and shown in FIG. 2 under the graph B.

The following is a summary of the operating regions in the second derivative technique:

INTERVALS OF STABLE FREQUENCY OFFSET $2\omega$ Detection (2nd Derivative)

LOCK-IN PHASE=$\phi$=90° (same assumptions as in first derivative case above)
INTERVAL (4)
  Subinterval (4A) is B2<0
  Subinterval (4B) if B2>0
  POINT P6 FOR B2=0 (as in the prior art)
LOCK-IN PHASE=$\phi$=270°
INTERVAL (3)
  Subinterval 3A if B2>0
  Subinterval 3B if B2>0
  POINT P5 FOR B2=0 (as in the prior art)

In the second derivative technique there are four subintervals 3A, 3B, 4A, 4B of stabilization. The offset voltage B2 can be + or −, which means that the operating point must be below or above the horizontal axis, respectively, but also in interval (3), the lock-in amplifier signal is rising in amplitude with increasing frequency and, in interval (4), the signal is falling in amplitude with increasing frequency.

Not only does it matter in the second derivative case where you are above or below the horizontal axis, which determines whether the offset voltage is − or +, but it also matters whether the signal is increasing or decreasing with increasing frequency; therefore, another parameter to consider is the phase of the lock-in amplifier. The $2\omega$ component of the spectrophone signal into the lock-in amplifier is 90° out of phase with the oscillator output; therefore the lock-in amplifier is at a 90° setting initially to stabilize in subintervals 4A and 4B. Over this region the slope is the same as in the first derivative case, falling with increasing frequency. If the lock-in amplifier phase is changed to 270°, stabilization is possible in subintervals 3A and 3B where the slope is opposite that of the first derivative case.

Another important feature of the invention is that the amplitude of the dither will determine how broad the detected curves are. As the dither amplitude is increased, the curves of graphs B and C in FIG. 2 get broader. What that means is that if it is desired to lock a little bit further out from line center on the frequency axis, the dithering amplitude can be increased to broaden the detected signal curves of graphs B and C. It is then possible to lock (stabilize) at that frequency.

The spectrophone signal into the lock-in amplifier is proportional to the power of the laser. A technique for making that signal independent of the laser power utilizes another beam splitter 42 directing a portion of the laser beam into a power detector 44, obtaining the voltage signal $P_L$ which is proportional to laser power, and then dividing the spectrophone signal S by that voltage signal in an analog dividing circuit 46, so that a signal that is independent of the laser power is obtained. Thus, because the spectrophone signal S is proportional to laser power, after dividing by the laser power, the dependence is removed so that the dependence of the absorption curve, rather than the dependence of the output power of the laser with offset, is available in the signal $A_1S/A_2P_L$ into the lock-in amplifier 28, where $A_1$ and $A_2$ are fixed (or adjusted) gain factors of amplifiers 48 and 50. This technique may be omitted if the laser being used is approximately constant in power over the region of operation.

If should be noted that when the laser is locked and stabilized at some point off line center, the amount of offset from center can be adjusted by three separate parameters: the voltage B2 offset; the amplitude of the dither, because that will widen or narrow the detection curve; and the pressure of the gas in the spectrophone, because that too will widen or narrow the absorption curve, thereby adjusting the amount of offset correspondingly. In practice, it will not be convenient to adjust pressure, once the instrument is set up for an experiment. Instead the pressure will be selected for some nominal breadth of the absorption curve. The breadth of the detection curve can then be modified during operation by adjusting the amplitude of the dither added by adjustment of the gain of the amplifier 40. Note that coupling amplifiers 40, 48, 50 and 52, like amplifier 38, each have adjustable gain which may be unity, or may be greater or less than unity, and that amplifiers 48 and 50 may have their relative gains adjusted to effectively set the range of the signal input to the lock-in amplifier.

It will also be noted that the signal obtained with the first derivative technique is smaller than would be obtained with a light chopper; the signal obtained with the second derivative technique is smaller yet. This assumes that $m < 1$ where we define the peak-to-peak amplitude of the dither signal in units of laser frequency as $2m\gamma_L$. These facts emphasize the importance of the use of a spectrophone as a sensitive transducer which makes these techniques possible. Also, the ability to choose the width of the absorption line through the choice of the gas pressure in the spectrophone, allows greater flexibility in the overall stability or "tightness" of the feedback loop. The technique is applicable to all three possible absorption lineshapes of the spectrophone gas fill: Lorentzian, Doppler, or Voigt. The modulation of an absorption lineshape for the first two possibilities will now be described with reference to FIGS. 3 and 4 and FIGS. 5 and 6 respectively.

Lorentzian Lineshape

Consider a general experimental configuration where the response or signal is affected by some experimental parameter and the shape of this effect is the Lorentzian lineshape. Using frequency, $\nu$, as the experimental parameter, although it may be any parameter (e.g. voltage, magnetic field, etc.), the specific equations of the Lorentzian lineshape, its first three derivatives and their maxima are given in Table 1 shown in Appendix A.

Assuming a small sinusoidal dither, at a modulation frequency of $\omega$, of the experimental parameter $\nu$, the resultant frequency is given by:

$$\nu = \nu_0 + \nu_1 + m\gamma_L \sin\omega t. \quad (1)$$

where $\nu_0$ is the Lorentzian linecenter frequency, $\nu_1$ is the offset frequency from linecenter, $\gamma_L$ is the half-width at half-maximum (HWHM), and m is the modulation coefficient. The peak-to-peak modulation is $2m\gamma_L$. Inserting equation (1) into the Lorentzian equation yields the following equation:

$$\sigma(\nu_1, m, t) = \frac{S}{\pi} \frac{\gamma_L}{(\nu_1 + m\gamma_L \sin\omega t)^2 + \gamma_L^2} = \quad (2)$$

$$\frac{S\gamma_L}{\pi(\nu_1^2 + \gamma_L^2)} \frac{1}{1 + \left[\dfrac{2\nu_1 m\gamma_L \sin\omega t + (m\gamma_L)^2 \sin^2\omega t}{\nu_1^2 + \gamma_L^2}\right]}.$$

For $m < 1$, equation (2) is expanded using:

$$\frac{1}{1+x} = 1 - x + x^2 - x^3 + x^4 - \ldots (x^2 < 1), \quad (3)$$

to obtain $$\sigma(\nu_1, m, t) = \frac{S\gamma_L}{\pi(\nu_1^2 + \gamma_L^2)} \Bigg\{ 1 + m\gamma_L \left[\frac{-2\nu_1 \sin\omega t}{\nu_1^2 + \gamma_L^2}\right] + \quad (4)$$

$$(m\gamma_L)^2 \left[\frac{-1}{2(\nu_1^2 + \gamma_L^2)} + \frac{2\nu_1^2}{(\nu_1^2 + \gamma_L^2)^2} + \frac{\cos 2\omega t}{2(\nu_1^2 + \gamma_L^2)} - \frac{2\nu_1^2 \cos 2\omega t}{(\nu_1^2 + \gamma_L^2)^2}\right] +$$

$$(m\gamma_L)^3 \left[\frac{3\nu_1 \sin\omega t}{(\nu_1^2 + \gamma_L^2)^2} - \frac{6\nu_1^3 \sin\omega t}{(\nu_1^2 + \gamma_L^2)^3} - \frac{\nu_1 \sin 3\omega t}{(\nu_1^2 + \gamma_L^2)^2} + \frac{2\nu_1^3 \sin 3\omega t}{(\nu_1^2 + \gamma_L^2)^3}\right] + O(m^4) \Bigg\}.$$

Equation (4) reveals that the signal consists of a dc component, a component at the modulation frequency $\omega$, and components at all the harmonics of $\omega$. The odd harmonics of $\omega$, including $\omega$ itself, are in-phase with the initial dither signal, while the even harmonics are 90° out of phase. For values of m such less than 1, the high powers of m may be neglected. The signals at $\omega$ and $2\omega$ become:

$$\sigma^\omega = \frac{-2S\gamma_L}{\pi} \frac{\nu_1}{[\nu_1^2 + \gamma_L^2]^2} m\gamma_L \sin\omega t + O(m^3), \quad (5)$$

and $$\sigma^{2\omega} = \frac{2S\gamma_L}{\pi} \frac{(3\nu_1^2 - \gamma_L^2)}{[\nu_1^2 + \gamma_L^2]^3} \frac{(-m^2\gamma_L^2 \cos 2\omega t)}{4} + O(m^4). \quad (6)$$

If the sinusoidal amplitudes of equations (5) and (6) are compared with the entries of Table 1 for $\nu - \nu_0 = \nu_1$, it is evident that:

$$\frac{\text{in-phase signal at } \omega}{\text{first derivative}} = m\gamma_L, \quad (7)$$

-continued
and $$\frac{\text{quadrature signal at } 2\omega}{\text{second derivative}} = \frac{-m^2 \gamma_L^2}{4}. \quad (8)$$

Thus the $\omega$ signal is proportional to the first derivative and to $m\gamma_L$ and the $2\omega$ signal is proportional to the second derivative and to $(m\gamma_L)^2$. Each signal may be increased by increasing m. However, this will decrease the resolution in $\nu_1$ and eventually violate the assumption $m \ll 1$.

Equations (5) through (8) are approximations based on small dither amplitudes compared to the HWHM of the Lorentzian curve. However, the exact expression in equation (2) can be used with a Fourier series analysis to find the Fourier coefficients of the $\omega$ and $2\omega$ signal components. First, the offset frequency is expressed in terms of the HWHM by setting $\nu_1 = \beta \gamma_L$. The desired coefficients are then found to be:

$$b_1 = \frac{2S}{T\pi\gamma_L} \int_{-\frac{T}{2}}^{\frac{T}{2}} \frac{\sin(\omega t)}{1 + (\beta + m\sin\omega t)^2} dt, \quad (9)$$

and $$a_2 = \frac{2S}{T\pi\gamma_L} \int_{-\frac{T}{2}}^{\frac{T}{2}} \frac{\cos(2\omega t)}{1 + (\beta + m\sin\omega t)^2} dt. \quad (10)$$

Figure 3:
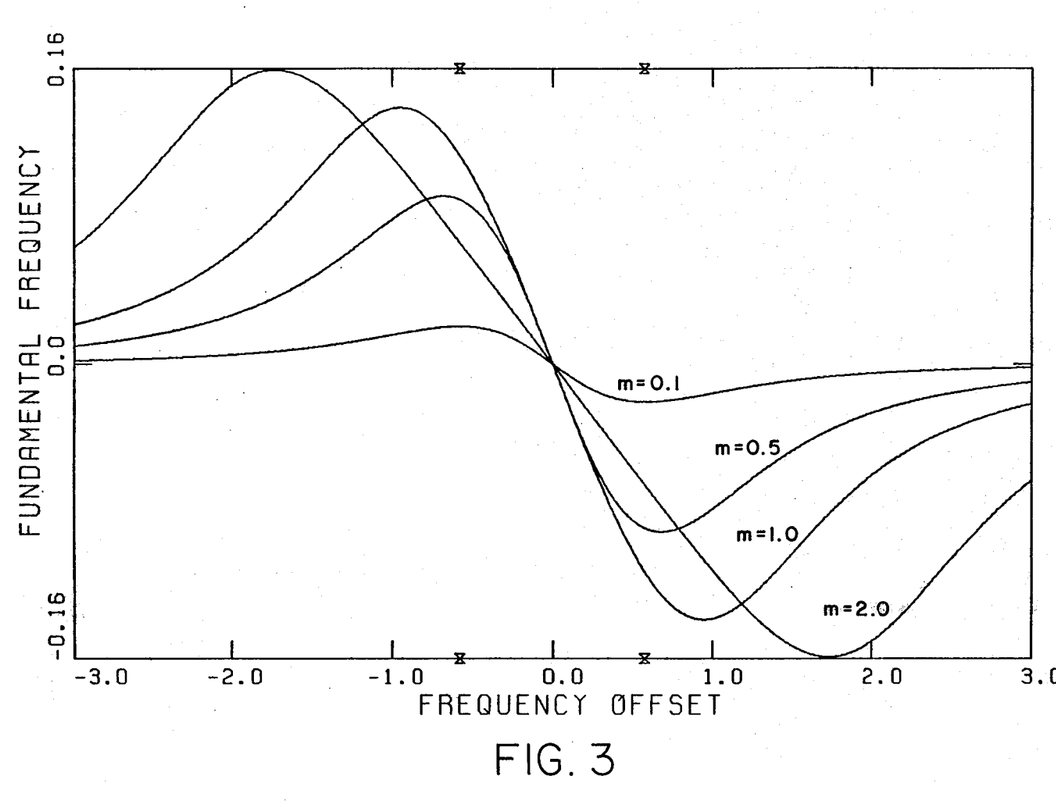
FIG. 3 shows a plot of the first derivative of the Lorentzian line response of a spectrophone for various values of modulation amplitude.
Figure 4:
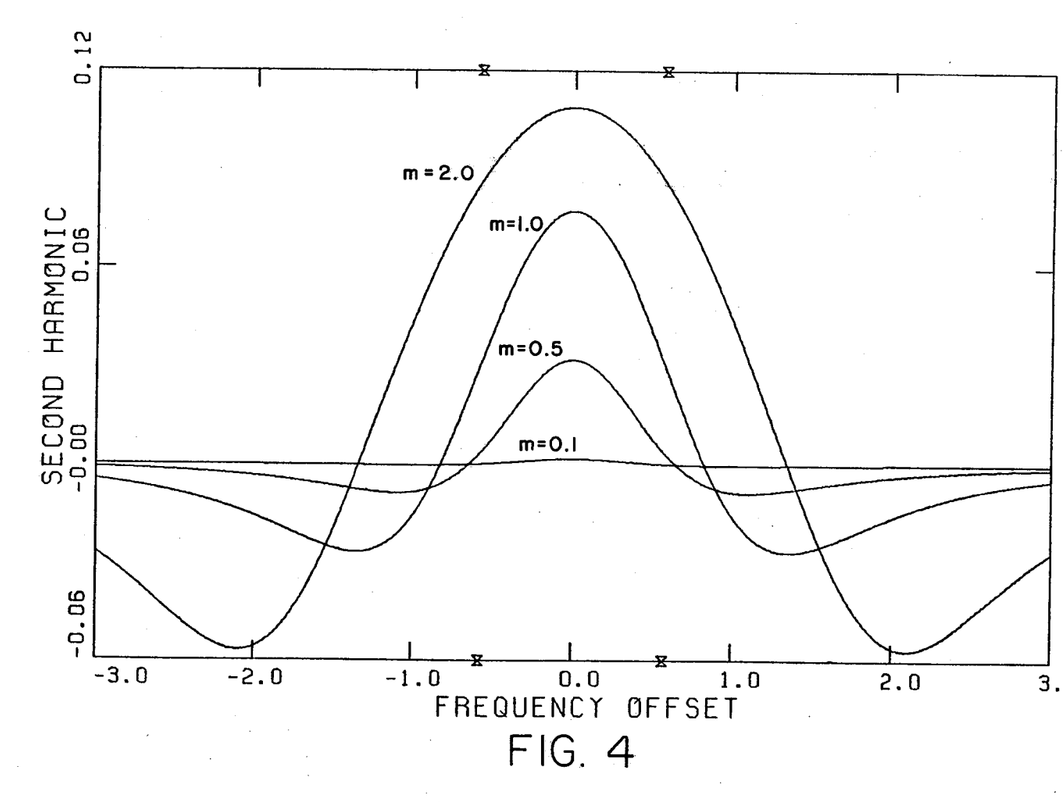
FIG. 4 shows a plot of the second derivative of the Lorentzian line response of a spectrophone for various values of modulation amplitude.

The integrals can be evaluated numerically. FIGS. 3 and 4 show plots of $\gamma_L b_1/S$ and $\gamma_L a_2/S$ vs. $\beta$ for various values of the modulation coefficient m. The specific values of m are 0.1, 0.5, 1.0, and 2.0, where m=2.0 corresponds to the largest signal, etc. In addition to an increasing signal with larger values of m, it is evident that the curves widen in the horizontal or frequency offset dimension. From Table 1, it is seen that the peak values of the first derivative (zero-crossings of the second derivative) occur at $(\nu - \nu_o) = \pm \gamma_L/\sqrt{3} = \pm 0.577 \gamma_L$. These frequency offset coordinates are marked on the figures. Thus first or second derivative data should be used to estimate $\gamma_L$ only for very small values of m, the modulation coefficient.

If large values of m are required because of signal-to-noise considerations, it may still be possible to derive $\gamma_L$ by measuring the derivative signals vs. frequency offset for two or more values of m.

From Table 1 in Appendix A, it is seen that the peak-to-peak excursions of the Lorentzian curve and its first two derivatives are:

$$\sigma_{P-P} = \frac{S}{\gamma_L} \frac{1}{\pi} = \frac{S}{\gamma_L}(0.318), \quad (11)$$

$$\sigma'_{P-P} = \frac{S}{\gamma_L^2} \frac{9}{4\pi\sqrt{3}} = \frac{S}{\gamma_L^2}(0.413), \quad (12)$$

and $$\sigma''_{P-P} = \frac{S}{\gamma_L^3} \frac{5}{2\pi} = \frac{S}{\gamma_L^3}(0.796). \quad (13)$$

The signal given in equation (11) is often obtained in an experiment by letting m=0 in equation (1) and then modulating the entire signal on and off (e.g. a chopped laser beam) at a modulation frequency $\omega$. Using equations (7) and (8), the theoretical peak-to-peak excursions for the chopped, first harmonic, and second harmonic signals may be expressed as follows:

$$\sigma_{P-P}^{CHOP} = \frac{S}{\pi\gamma_L}, \quad (14)$$

$$\sigma_{P-P}^{\omega} = \frac{S}{\pi\gamma_L} \frac{9m}{4\sqrt{3}}, \quad (15)$$

and $$\sigma_{P-P}^{2\omega} = \frac{S}{\pi\gamma_L} \frac{5m^2}{8}. \quad (16)$$

The ratios of the first and second harmonic signal excursions to the chopped signal excursion are 1.30 m and 0.63 m² respectively, and the ratio of the second harmonic to the first harmonic is 0.48 m.

Doppler Lineshape

Figure 5:
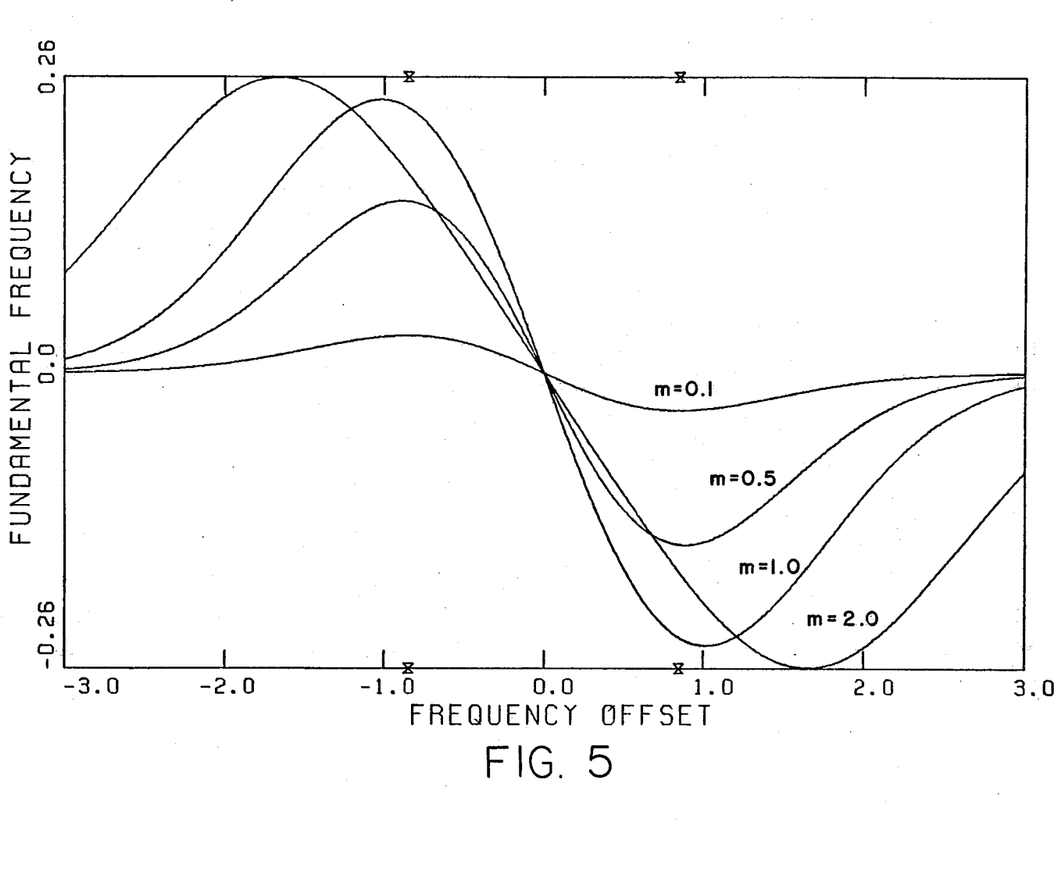
FIG. 5 shows a plot of the first derivative of the line response for the Doppler case.
Figure 6:
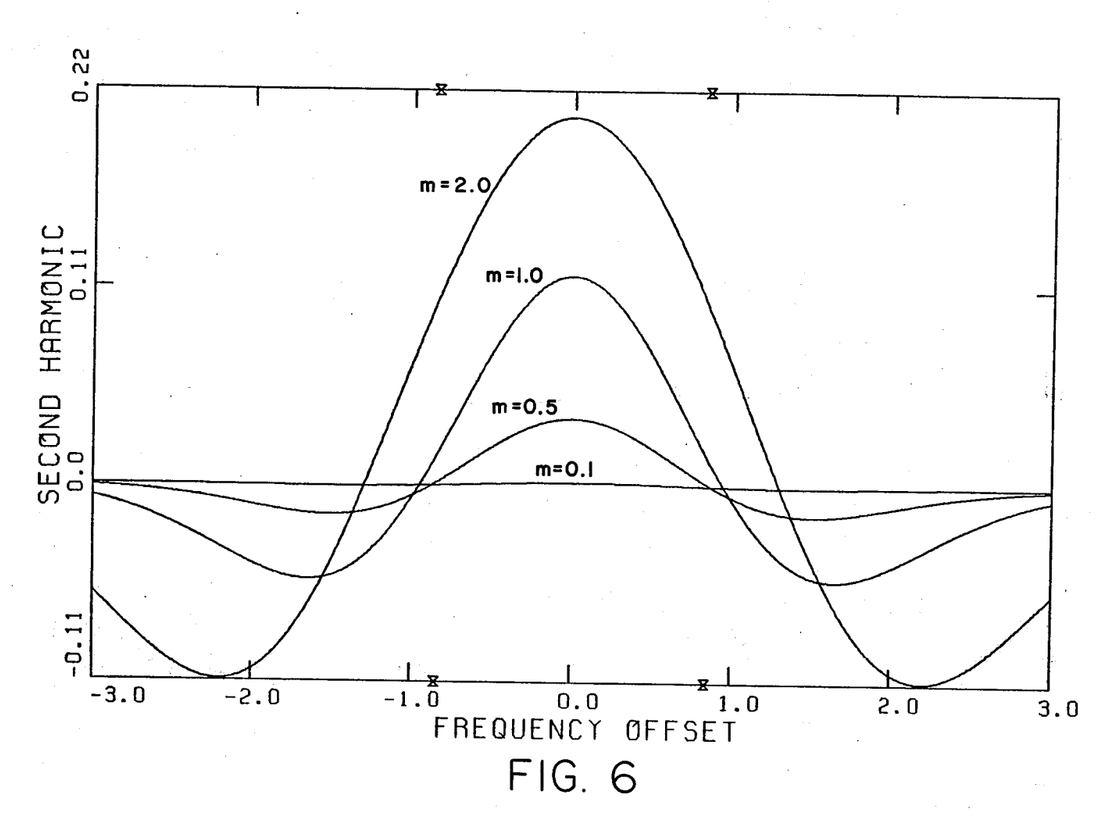
FIG. 6 shows a plot of the second derivative of the line response for the Doppler case.

The same analysis may be done for the Doppler lineshape. It can be shown that equations (7) and (8) apply also to the Doppler case with the same restrictions on m. Table 2 in Appendix B and FIGS. 5 and 6 provide the corresponding results for the Doppler case. Note that the peaks of the first derivative (zero crossings of the second derivative) occur at $(\nu - \nu_o) = \pm \gamma_D/\sqrt{2\ln 2} = \pm 0.85 \gamma_D$. Note also that the Doppler signal amplitudes are larger than the corresponding Lorentzian signal amplitudes. The Doppler peak-to-peak excursions corresponding to equations (11) through (13) are:

$$\sigma_{P-P} = \frac{S}{\gamma_D} \sqrt{\frac{\ln 2}{\pi}} = \frac{S}{\gamma_D}(0.470), \quad (17)$$

$$\sigma'_{P-P} = \frac{S}{\gamma_D^2} 2\ln 2 \sqrt{\frac{2}{\pi e}} = \frac{S}{\gamma_D^2}(0.671), \quad (18)$$

and $$\sigma''_{P-P} = \frac{S}{\gamma_D^3} \left[\frac{2(\ln 2)^{3/2}}{\sqrt{\pi}}\right] \left[\frac{2}{e^{3/2}} + 1\right] = \frac{S}{\gamma_D^3}(0.942). \quad (19)$$

Using equations (7) and (8), the peak-to-peak signals corresponding to equations (14) through (16) are:

$$\sigma_{P-P}^{CHOP} = \frac{S}{\gamma_D} \sqrt{\frac{\ln 2}{\pi}}, \quad (20)$$

$$\sigma_{P-P}^{\omega} = \frac{S}{\gamma_D} \sqrt{\frac{\ln 2}{\pi}} 2m \sqrt{\frac{2\ln 2}{e}}, \quad (21)$$

and $$\sigma_{P-P}^{2\omega} = \frac{S}{\gamma_D} \sqrt{\frac{\ln 2}{\pi}} \frac{m^2 \ln 2}{2} \left[\frac{2}{e^{3/2}} + 1\right]. \quad (22)$$

The ratios of the first and second harmonic signal excursions to the chopped signal excursion are 1.43 m and 0.50 m² respectively, and the ratio of the second harmonic to the first harmonic is 0.35 m.

Although particular embodiments of the invention have been described and illustrated herein, it is recognized that variations and equivalents may readily occur to those skilled in the art. For example, higher derivative operation, such as 3rd, 4th, etc. will also work but with lower amplitude. Consequently, it is intended that the claims be interpreted to cover such variations and equivalents.

TABLE 1
APPENDIX A
The Lorentzian Lineshape

| Symbol | Function | Maxima |
|---|---|---|
| Lorentzian Lineshape | | |
| $\sigma_L(\nu)$ | $\dfrac{S}{\pi} \dfrac{\gamma_L}{(\nu - \nu_0)^2 + \gamma_L^2}$ | $\dfrac{S}{\pi\gamma_L}$ at $(\nu - \nu_0) = 0$ |
| First Derivative | | |
| $\dfrac{d}{d\nu}\sigma_L(\nu)$ | $\dfrac{-2(\nu - \nu_0)}{[(\nu - \nu_0)^2 + \gamma_L^2]}\sigma_L(\nu)$ | $-\dfrac{\pm 9S}{8\sqrt{3}\,\pi\gamma_L^2}$ at $(\nu - \nu_0) = \pm\dfrac{\gamma_L}{\sqrt{3}}$ |
| Second Derivative | | |
| $\dfrac{d^2}{d\nu^2}\sigma_L(\nu)$ | $\dfrac{2[3(\nu - \nu_0)^2 - \gamma_L^2]}{[(\nu - \nu_0)^2 + \gamma_L^2]^2}\sigma_L(\nu)$ | $\dfrac{-2S}{\pi\gamma_L^3}$ at $(\nu - \nu_0) = 0$; $\dfrac{S}{2\pi\gamma_L^3}$ at $(\nu - \nu_0) = \pm\gamma_L$ |
| Third Derivative | | |
| $\dfrac{d^3}{d\nu^3}\sigma_L(\nu)$ | $\dfrac{24(\nu - \nu_0)[\gamma_L^2 - (\nu - \nu_0)^2]}{[(\nu - \nu_0)^2 + \gamma_L^2]^3}\sigma_L(\nu)$ | |

TABLE 2
APPENDIX B
The Doppler Lineshape

| Symbol | Function | Maxima |
|---|---|---|
| $\sigma_D(\nu)$ | $\dfrac{S}{\gamma_D}\left(\dfrac{\ln 2}{\pi}\right)^{\frac{1}{2}} e^{-\dfrac{(\nu-\nu_0)^2 \ln 2}{\gamma_D^2}}$ | $\dfrac{S}{\gamma_D}\left(\dfrac{\ln 2}{\pi}\right)^{\frac{1}{2}}$ at $(\nu - \nu_0) = 0$ |
| $\dfrac{d}{d\nu}\sigma_D(\nu)$ | $\dfrac{-2(\ln 2)(\nu - \nu_0)}{\gamma_D^2}\sigma_D(\nu)$ | $-\dfrac{\pm S\ln 2}{\gamma_D^2}\left(\dfrac{2}{\pi e}\right)^{\frac{1}{2}}$ at $(\nu - \nu_0) = \dfrac{\pm\gamma_D}{(2\ln 2)^{\frac{1}{2}}}$ |
| $\dfrac{d^2}{d\nu^2}\sigma_D(\nu)$ | $\left[\dfrac{2\ln 2}{\gamma_D^2}\right]\left[\dfrac{2\ln 2(\nu - \nu_0)^2}{\gamma_D^2} - 1\right]\sigma_D(\nu)$ | $\dfrac{-2S(\ln 2)^{3/2}}{\gamma_D^3 \pi^{\frac{1}{2}}}$ at $(\nu - \nu_0) = 0$; $\dfrac{4S(\ln 2)^{3/2}}{\gamma_D^3 \pi^{\frac{1}{2}} e^{3/2}}$ at $(\nu - \nu_0) = \pm\left(\dfrac{3}{2\ln 2}\right)^{\frac{1}{2}}\gamma_D$ |
| $\dfrac{d^3}{d\nu^3}\sigma_D(\nu)$ | $\left[\dfrac{4(\ln 2)^2(\nu - \nu_0)}{\gamma_D^4}\right]\left[3 - \dfrac{2\ln 2(\nu - \nu_0)^2}{\gamma_D^2}\right]\sigma_D(\nu)$ | |

What is claimed is:

1. A method for continuous tuning of a frequency stabilized cw gas laser over the spectral linewidth of the gas comprising the steps of dither modulating the frequency of said laser beam about a frequency offset from the absorption line center of said gas, said offset being selectably adjusted for the desired operating region of tuning within the spectral linewidth of the gas, sensing the dither modulation of said laser beam with the same gas as said laser to produce an output signal proportional to the dithered frequency corresponding to the absorption characteristics of the gas, detecting a derivative of said output signal, integrating the detected derivative to produce a correction of said frequency offset, and adding an adjustable constant value to said derivative before integrating it as a signal, whereby the frequency of said laser may be tuned to any frequency over the spectral linewidth of said gas by adjusting said dither frequency offset to a desired operating region within the spectral linewidth of said gas and adjusting said constant value for continuous offset tuning in the desired operating region.

2. A method as defined in claim 1 wherein said derivative is the first derivative.

3. A method as defined in claim 1 wherein said derivative is the second derivative.

4. A method as defined in claim 1 including the steps of detecting the power of said laser beam and dividing the signal produced by said spectrophone by said power before detecting a derivative, thereby to remove the power dependence of the signal to be detected and integrated.

5. A method as defined in claim 1 wherein the amount of frequency offset from the absorption line center of said gas after the laser is locked is adjusted by changing the amplitude of the dither modulation.

6. A method as defined in claim 1 or 5, wherein the amount of frequency offset from the absorption line center of said gas after the laser is locked is adjusted by changing the pressure of said gas in said spectrophone.

7. A method as defined in claim 6 wherein the amount of frequency offset from the absorption line center of said gas after the laser is locked is adjusted by changing the constant value added to said derivative.

8. Apparatus for continuous offset tuning a frequency stabilized cw gas laser comprising means for offsetting the frequency of said laser from the absorption line center of the laser gas, said offset being selected for the desired operating region of tuning within the spectral linewidth of the gas, means for dither modulating the frequency of said laser beam, gas absorption means for sensing said modulation of said laser beam using the same gas as in said laser, to produce an output signal proportional to the dithered frequency corresponding to the absorption characteristics of said gas, means for detecting a derivative of said output signal, means for integrating the detected derivative to produce a correction for said offsetting means to lock the laser operation into the offset frequency, and means for adding an adjustable constant value to said derivative before integration, whereby frequency of said laser may be tuned to any frequency over the spectral linewidth of said gas by adjusting said dither frequency offset to the desired operating region within the spectral line width of said gas and adjusting said constant value for continuous offset tuning in the desired operating region.

9. Apparatus as defined in claim 8 wherein said sensing means is comprised of a spectrophone.

10. Apparatus as defined in claim 9 wherein said detecting means is comprised of a lock-in amplifier.

11. Apparatus as defined in claim 10 wherein said detecting means detects the first derivative of said spectrophone output signal.

12. Apparatus as defined in claim 10 wherein said detecting means detects the second derivative of said spectrophone output signal.

13. Apparatus as defined in claim 8 including means for detecting the power of said laser, and means for dividing the output signal of said spectrophone by said laser power before detection, thereby to provide a frequency stabilizing system independent of variations in laser power output.

* * * * *